(12) United States Patent
Jasperse

(10) Patent No.: US 6,305,253 B1
(45) Date of Patent: Oct. 23, 2001

(54) AUTOMATIC FASTENING SYSTEM

(76) Inventor: Thomas J. Jasperse, 3438 Taylor St., Jenison, MI (US) 49428

( * ) Notice: Subject to any disclaimer, the term of this patent is extended or adjusted under 35 U.S.C. 154(b) by 0 days.

(21) Appl. No.: 09/506,306

(22) Filed: Feb. 17, 2000

Related U.S. Application Data

(60) Provisional application No. 60/120,940, filed on Feb. 19, 1999.

(51) Int. Cl.$^7$ ...................................................... B25B 23/06
(52) U.S. Cl. ............................................. 81/430; 81/57.37
(58) Field of Search .................................. 81/57.37, 430, 81/432

(56) References Cited

U.S. PATENT DOCUMENTS

| | | | |
|---|---|---|---|
| 3,283,791 | * | 11/1966 | Weber ....................................... 81/432 |
| 4,501,176 | * | 2/1985 | Sanders ................................ 81/430 X |
| 5,031,489 | * | 7/1991 | Young et al. ............................. 81/430 |
| 5,365,810 | * | 11/1994 | Inaniwa et al. ........................... 81/430 |

* cited by examiner

Primary Examiner—James G. Smith
(74) Attorney, Agent, or Firm—VanDyke, Gardner, Linn & Burkhart, LLP

(57) ABSTRACT

An automatic fastener feed system provides a nut, bolt or other fastener to a movable drive tool such that the fastener is automatically engaged with a drive member on the drive tool and subsequently driven onto a corresponding fastener on a work piece. The feed system includes a fastener acceptor which is adapted for connection to a parts feeder via a supply line. The parts feeder provides the fasteners to the fastener acceptor, which at least temporarily retains the fastener in a position for engagement with the drive member. As the drive member rotates and moves through the fastener acceptor toward a mating fastener on a work piece, the fastener within the fastener acceptor is automatically aligned and engaged with the mating fastener as the drive member is rotatably driven by the drive tool. Continued operation of the drive member causes the fastener acceptor to release the fastener, thereby allowing the fastener to be driven completely onto the mating fastener on the work piece.

11 Claims, 3 Drawing Sheets

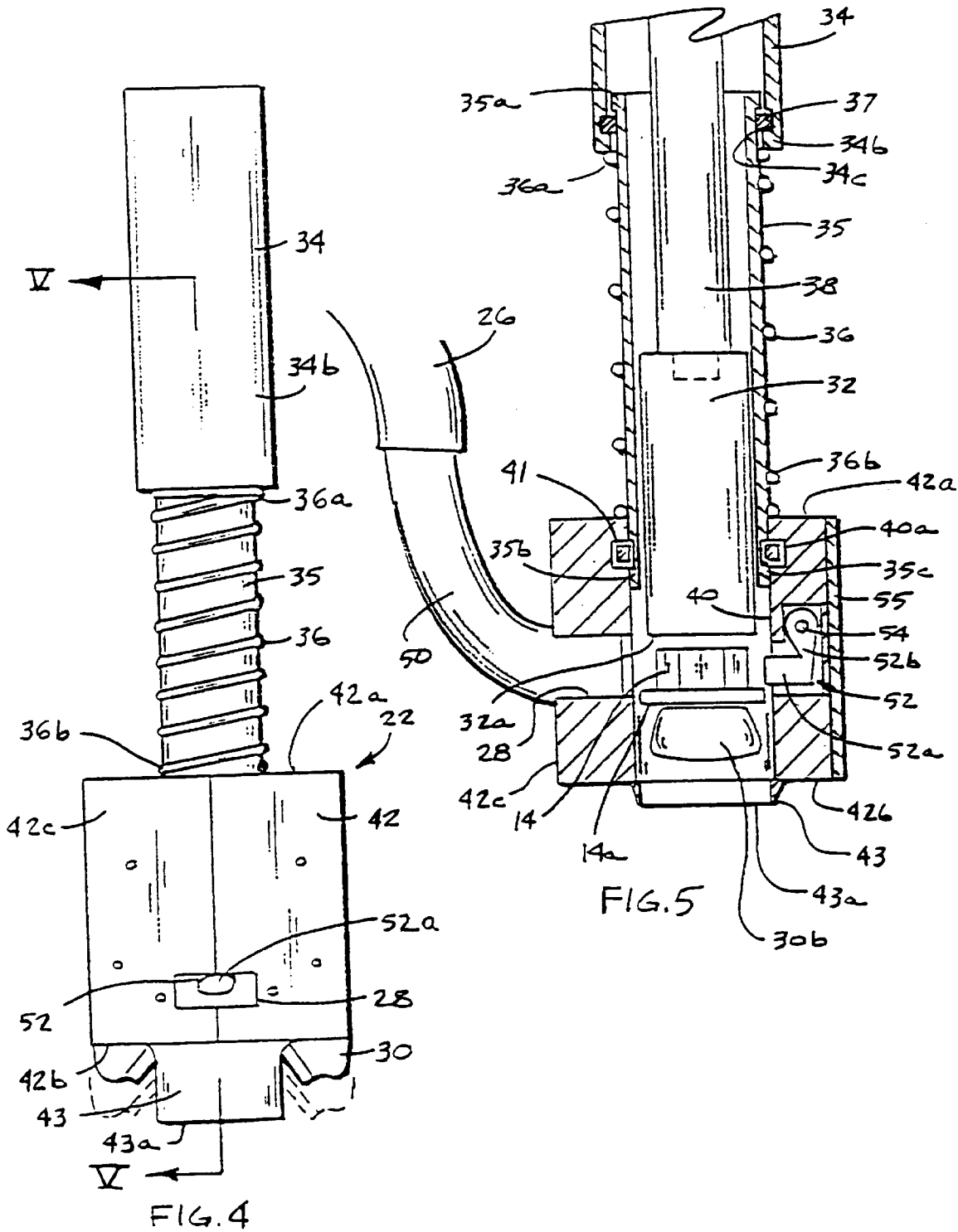

AUTOMATIC FASTENING SYSTEM

This non-provisional application claims priority from U.S. provisional Pat. application, Ser. No. 60/120,940, filed Feb. 19, 1999, which is hereby incorporated herein by reference.

FIELD OF THE INVENTION

This invention relates to automatic fastener feeding devices and, more particularly, to devices for automatically delivering a nut, bolt or other fastener to a movable, positionable tool or fastening device.

BACKGROUND OF THE INVENTION

Presently, there are devices available that automatically feed a nut or other fastener to a fixed position tool, which is rigidly mounted inside a fixture and to which a particular work piece must be brought and aligned therewith. However, such a device is highly impractical in industries where assemblies or sub-assemblies are proceeding down an assembly line, thereby making it practically impossible to align the assembly with the rigidly mounted tool. For example, in the automotive industry, entire car or truck sub-assemblies proceed down an assembly line and may require an operator to secure several fasteners in multiple locations on the assembly. In cases such as these, manufacturers have typically implemented hand-held fastening tools for driving a bolt or nut or other fastener onto the particular assembly. However, the present automatic feeders cannot work with these fastening tools, so the fastener must be manually started on its respective mating fastener or it must be manually loaded into a magnetic socket on the fastening tool, and then in both cases be driven to the proper location or torque on the assembly or sub-assembly.

In order to assist an operator using a hand held drive tool, automatic parts feeding systems have been developed which supply nuts and/or bolts or other fasteners in a desired orientation to a particular location along the assembly line. This eases the process of installing the fastener at its location on the assembly or sub-assembly, as the operator may pick up the fastener while it is in its proper orientation, thereby easing the starting of the fastener onto its mating fastener. However, the fastener still must be picked up by hand and either manually started on the mating fastener or manually located into the magnetic socket of the fastening tool, before the fastener may be driven onto its mating fastener by the drive tool. The process of manually starting the fastener onto a mating fastener or manually loading the fastener into a magnetic socket on the drive tool is not only difficult for an assembly line operator to consistently accomplish, but also takes a substantial amount of time, during which the assembly or sub-assembly is continuously moving along the assembly line. Therefore, the line speeds must be adjusted to allow for the additional time for the line worker to manually start or load the fasteners, thereby increasing the assembly time for the particular product being assembled.

Therefore, there is a need in the art for an automatic device that effectively provides the connection between automatic feed systems and hand held or movable fastening and torque monitoring equipment. The device should be able to be used with pneumatic and hand held fastening tools to eliminate the manual starting or loading of the fastener by the operator. The device should further be able to supply the fastener to the tool in an efficient manner so that the device may be used in a production setting where production volumes are high and the fasteners must be quickly secured to the assembly or sub-assembly as it moves along an assembly line. Furthermore, the device should supply and hold the fastener in a proper alignment to ease engagement with the mating fastener on the work piece and substantially preclude cross threading between the two corresponding fasteners.

SUMMARY OF THE INVENTION

The present invention provides an automatic fastener feed system which supplies a tool, preferably a movable tool such as a fastening or torque monitoring device, with an appropriate fastener, thereby avoiding the process of manually loading the fastener onto the fastener drive tool, or manually starting the fastener on a respective mating fastener.

According to a first aspect of the invention, an automatic fastener system is provided for fastening a fastener to a mating fastener. The fastener is provided to the system via a fastener feeder, which orients the fastener and provides the fastener feed system with a fastener in an appropriate orientation for engagement by the fastener system. The automatic fastener system comprises a movable drive tool member for fastening the fastener to a mating fastener and a fastener acceptor. The movable drive tool member is movable to align with a mating fastener. The fastener acceptor comprises a passageway which has a fastening end. The fastener acceptor is adapted to receive and at least initially slidably support a fastener along the passageway. The movable drive tool member is slidable along the passageway to engage the fastener and drive the fastener along the passageway onto a mating fastener at the fastening end of the passageway.

Preferably, the fastener is initially secured to the driver by at least one retaining arm within the fastener acceptor. The retaining arm moves longitudinally along the passageway of the fastener acceptor while simultaneously moving radially outwardly from the driver and fastener, thereby releasing the fastener after the driver has traveled a pre-determined distance toward the mating fastener on the work piece. Preferably, a second retaining arm is provided substantially opposite the first retaining arm. Preferably, a biasing member is provided to bias the retaining arms in an initial position whereby the fastener is supported for engagement with the drive member.

In one form, the fastener acceptor is longitudinally guided and movable relative to the drive tool and drive member via a guide sleeve. Preferably, the guide sleeve further comprises a biasing member to bias the fastener acceptor in an initial position whereby the drive member is positioned remotely from a fastener received within the fastener acceptor.

According to another aspect of the present invention, an automatic fastener feed system is provided for supplying a fastener to a drive tool for connecting the fastener to a mating fastener. The drive tool has a fastener drive member for rotatably driving a fastener. The fastener feed system is adapted for interconnection to a parts feeder which orients the fastener and provides the system with a fastener in an appropriate orientation relative to a mating fastener. The fastener feed system comprises a fastener acceptor which receives the fastener and at least initially secures the fastener in a position aligned and engageable with the fastener drive member when the fastener acceptor is connected to such a drive member. The fastener drive member is adapted to be positioned relative to the fastener in an initial position such that the fastener is not engaged with the fastener drive member. The fastener acceptor has a passageway which allows movement of the fastener drive member through the fastener acceptor to move the fastener drive member toward a mating fastener for engagement therewith. The fastener acceptor correspondingly releases the fastener as the fastener is aligned and engaged with the mating fastener.

In one form, an energy absorbing member, preferably in the form of a fastener snubber, is provided within the fastener acceptor to absorb energy when the fastener enters the fastener acceptor from the parts feeder. This prevents the fastener from impacting an opposite wall of the fastener acceptor and rebounding therefrom, and substantially ensures that the fastener will be properly positioned adjacent the fastener driver.

These and other objects, advantages, purposes, and features of this invention will become apparent upon review of the following specification in conjunction with the drawings.

BRIEF DESCRIPTION OF THE DRAWINGS

FIG. 4 is another side elevation of the present invention, showing the fastener-receiving opening therein; and FIG. 5 is a sectional view of the present invention, taken along the line V—V in FIG. 4.

DESCRIPTION OF THE PREFERRED EMBODIMENTS

Figure 1:
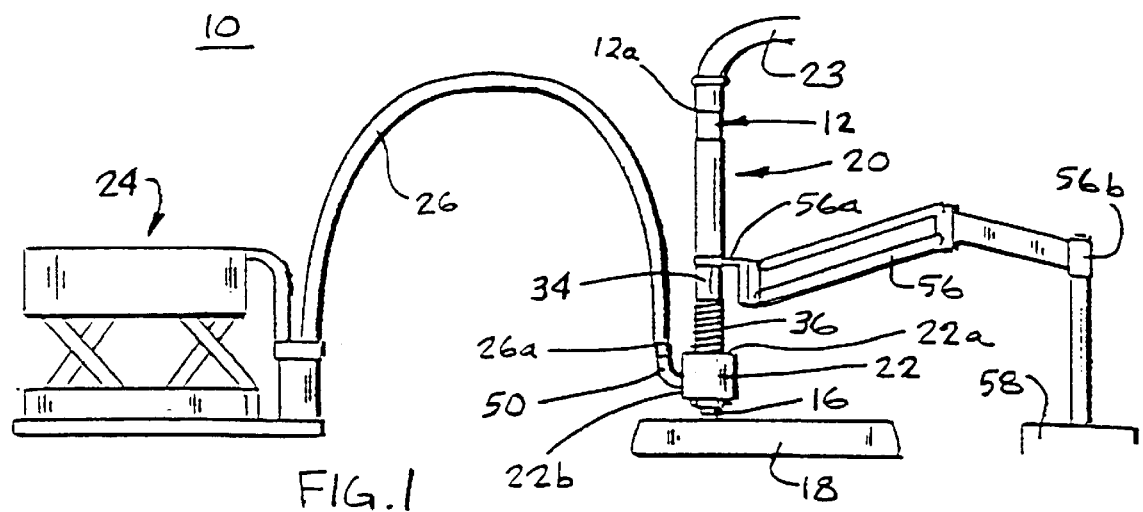
FIG. 1 is a side elevation of an assembly station incorporating the present invention.
Figure 2:
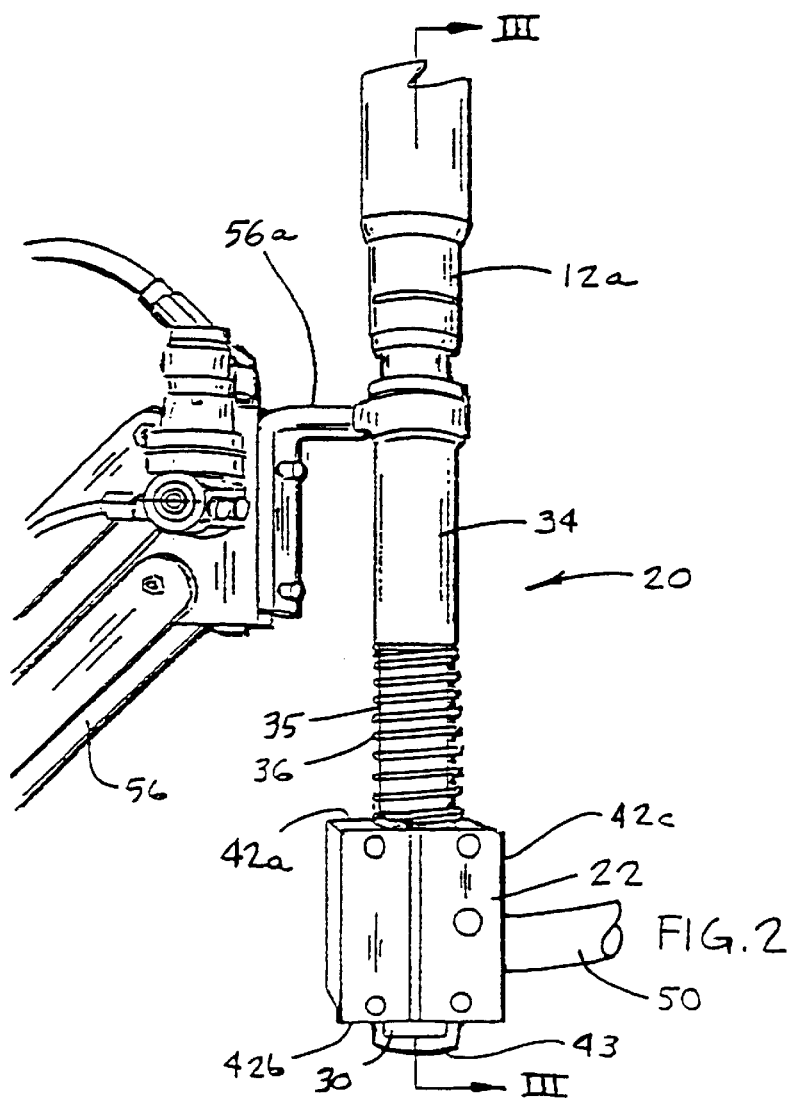
FIG. 2 is a side elevation of the shaft and fastener acceptor of the present invention.
Figure 3:
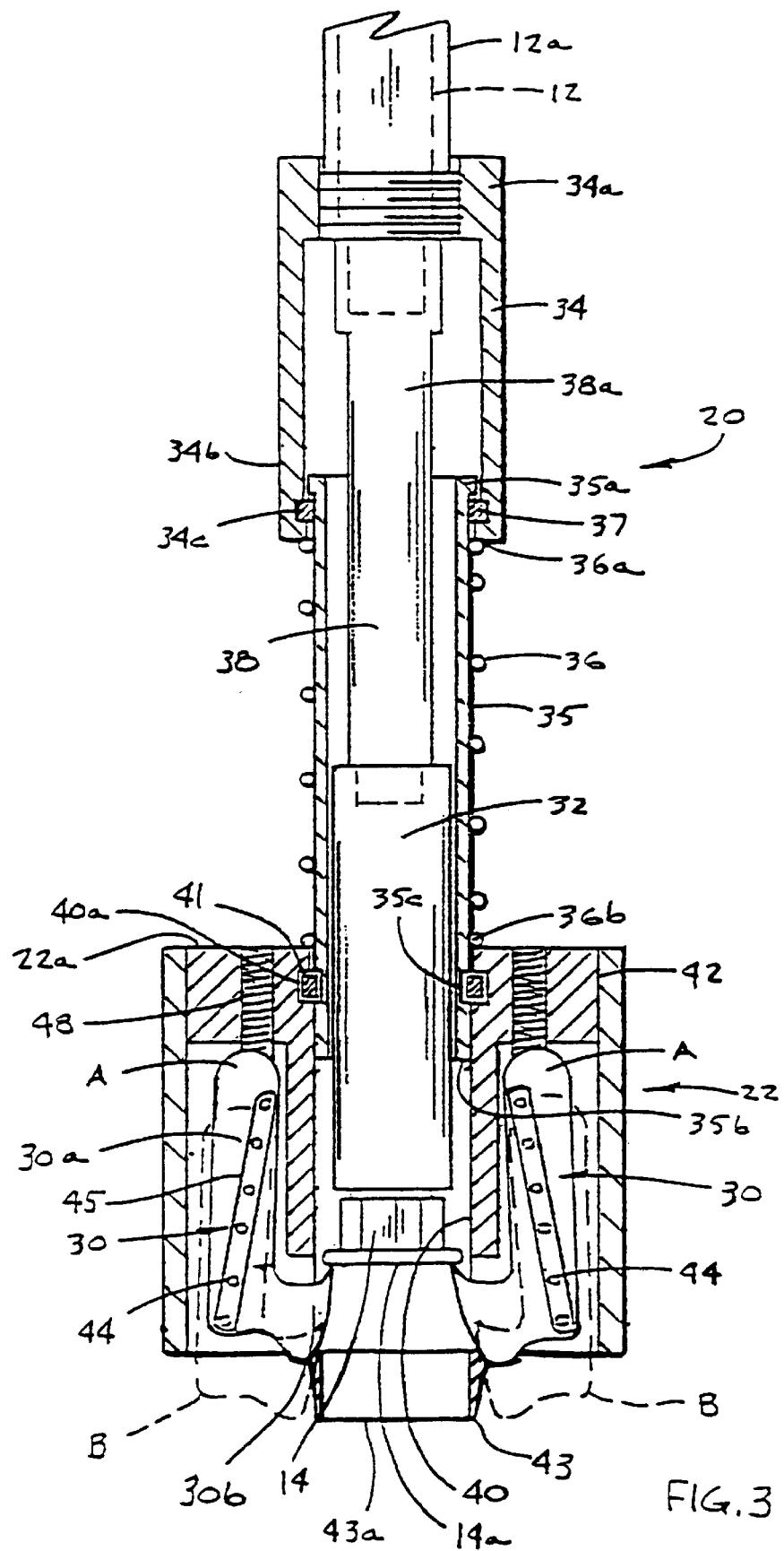
FIG. 3 is a sectional view of the present invention taken along line III—III in FIG. 2.

Referring now specifically to the drawings and the illustrative embodiments depicted therein, an automatic fastener feed system 10 is shown in FIG. 1 for automatically providing a drive socket or other fastener driving member 12 with a nut, bolt or other fastener 14 (FIGS. 3 and 5), which may then be rotatably driven onto a mating or corresponding fastener 16 on a work piece 18. The automatic fastener feed system 10 includes a tube or shaft section 20 and a fastener nest or acceptor 22. The shaft section 20 is secured at one end to a drive member casing 12a substantially encasing drive member 12, which is further interconnected to a driver motor (not shown) by a control cable 23 or the like. A vibratory parts feeder 24 is provided to orient and preferably blow feed or otherwise communicate the fasteners 14 through a flexible tube 26 to the fastener acceptor 22 of the automatic fastener feed system 10. Once the fastener 14 enters the fastener acceptor 22 through a fastener entry area 28, the fastener is temporarily secured in its proper orientation by at least one retaining arm or slide rail 30 (FIG. 3). A second socket extension or driving member 32 (FIGS. 3 and 5) may be interconnected with drive member 12 in order to engage the fastener 14 to rotate and move the fastener 14 through the fastener acceptor 22 and onto the corresponding fastener 16 on the work piece 18.

The shaft section 20, as best shown in FIG. 3, preferably includes an upper or outer tube or shaft 34, a lower or inner tube 35, a biasing member 36, such as a coil spring or other biasing device, and may include second driving member or socket 32. Outer tube 34 is hollow and is fixedly secured at an upper end 34a to drive member casing 12a, such that outer tube 34 extends downward and substantially encases drive member 12 and at least a portion of extender 38, if applicable. As best shown in FIG. 3, outer tube 34 and drive member casing 12a may be correspondingly threaded to allow for easy attachment of outer tube 34 to the drive tool. A lower end 34b of outer tube 34 forms a cylindrical opening into which an upper end of inner tube 35 is inserted, since inner tube 35 is of a smaller exterior diameter than an interior diameter of outer tube 34, such that inner tube 35 slideably inserts and may rotate within outer tube 34. An annular notch or groove 34c is formed near lower end 34b of outer tube 34 to receive a corresponding ring or seal 37 therein.

Inner tube 35 is also hollow and at least partially encases second drive member 32 and driver extender 38, such that second drive member 32 may rotate and travel longitudinally within inner tube 35, as discussed below. At an upper end of inner tube 35, an annular flange 35a extends radially outward, such that flange 35a contacts ring 37 when inner tube 35 is moved outwardly from outer tube 34, thereby limiting the travel of inner tube 35 relative to outer tube 34 and preventing inner tube 35 from being entirely removed therefrom. A lower end 35b of inner tube 35 inserts into a cylindrical opening or passageway 40 which extends longitudinally through fastener acceptor 22. A pair of corresponding annular notches or grooves 35c and 40a are formed in lower end 35b of inner tube 35 and passageway 40, respectively, to receive a second locking ring 41 therebetween. Locking ring 41 engages both annular grooves 35c and 40a and substantially precludes longitudinal travel of inner tube 35 relative to fastener acceptor 22, while allowing relative rotation therebetween.

Second drive member 32 is driven or rotated by the drive tool motor via the control cable 23 and/or drive member 12 of the drive tool. A driver extender 38 may also extend longitudinally through the outer tube 34 to interconnect the drive member 12 of the fastener drive tool to the second drive member 32 of the automatic fastener feed system. Preferably, second drive member 32 is extendable through passageway 40 substantially beyond lower end 35b of inner tube 35, and may rotate freely within inner tube 35 and fastener acceptor 22 as it is driven by the drive tool. Second drive member 32 may be a socket such as a steel hexagonal socket, or a star driver or the like, and is selected to be engageable with the fasteners used in the particular application. Preferably, second drive member 32 is a deep well socket to allow attachment of the fastener 14, such as a nut, onto a corresponding fastener 16, which may be a stud or a bolt of varying length.

Biasing member or spring 36 is positioned along inner tube 35 between fastener acceptor 22 and outer tube 34, with one end 36a of spring 36 abutting lower end 34b of outer tube 34 and the other end 36b of spring 36 contacting an upper surface 22a of fastener acceptor 22. Spring 36 exerts a force against outer tube 34 and fastener acceptor 22, and thus functions to bias fastener feed system 10 in a fully extended initial position, such that second drive member 32 is positioned at a height above, or otherwise remote from, the fastener entry area 28 of fastener acceptor 22 (FIG. 5). Although the invention is shown with a spring biasing the shaft in this position, clearly other means for biasing the shaft section 20 may be implemented without affecting the scope of the present invention.

Fastener acceptor 22 includes at least one slide rail or retaining arm 30 (FIG. 3), a fastener entry area 28 through one side 22b of fastener acceptor 22 (FIGS. 4 and 5) and a substantially cylindrical passageway 40 extending entirely through the fastener acceptor 22. An outer housing 42 substantially encases the retaining arms 30 and further provides for the cylindrical passageway 40 between each end 42a and 42b and the fastener entry area 28 on one side 42c. At end 42b of housing 42, a fastener guide opening 43 may be included to guide the mating fastener 16 into the cylindrical passageway 40 for engagement with the fastener 14, as discussed further below. Preferably, housing 42 comprises steel for strength and durability of the feed system 10. However, housing 42 may comprise other material, or may comprise an inner, steel liner encased within an aluminum casing, without affecting the scope of the present invention.

As best shown in FIG. 3, retaining arms 30 are preferably positioned longitudinally along an inner portion of fastener acceptor 22. Each retaining arm 30 is preferably formed so as to have a longitudinal slide section 30a and a hook or support section 30b, which extends inwardly from slide section 30a toward cylindrical passageway 40 of fastener acceptor 22. The slide section 30a may include a plurality of guide pins or rollers 44, which slideably engage at least one slot or groove 45 within fastener acceptor 22. The guide pins 44 and the slot or groove 45 are oriented such that each retaining arm 30 slides longitudinally along cylindrical opening 40 toward the guide opening 43 for the mating fastener, while also sliding outwardly, away from the cylindrical opening 40. As shown in FIG. 3, retaining arms 30 slide between an initial position A, where retaining arms 30 support a fastener 14, and an extended position B, where retaining arms 30 release fastener 14. At least one arm biasing member or spring 48, or other means to bias the retaining arms 30 in their inner most position A within fastener acceptor 22, is preferably provided at one end of each arm 30 and is further secured to fastener acceptor 22. Each spring 48 is operable to exert a return force on the corresponding arm 30 to return the arm 30 to its initial position A after the fastener has been secured to or engaged with the mating fastener. Preferably, two springs 48 and corresponding retaining arms 30, which are substantially mirror images of each other, are positioned substantially opposite one another within fastener acceptor 22, as shown in FIG. 3. Preferably, the arms 30 comprise steel or the like, in order to withstand the rotation of the fastener at the support sections 30b as the fastener is rotatably supported on arms 30 while being driven toward and onto the mating fastener, thereby extending the life of the arms 30.

As best shown in FIGS. 4 and 5, the fastener entry area 28 is positioned at a side 42c of housing 42 of fastener acceptor 22, such that the fastener may be provided from an adapter 50, which connects the flex tube 26 of the vibratory parts feeder 24 to acceptor 22. The fastener is thus provided by parts feeder 24 to fastener acceptor 22 in its properly oriented position, such that the second drive member 32 of shaft section 20 may rotate and move through fastener acceptor 22 toward work piece 18, thereby engaging the fastener 14 and further driving fastener 14 onto its respective mating fastener 16 on work piece 18, as discussed further below. An energy absorbing snubber or bumper 52 may further be provided within fastener acceptor 22 at a location substantially opposite fastener entry area 28. Snubber 52 may be made of steel or other material that allows snubber 52 to withstand an impact with fastener 14 and prevent fastener 14 from deflecting back out of fastener acceptor 22, as discussed below. Snubber 52 is preferably generally L-shaped and comprises a fastener impact area 52a and a pivot arm 52b, which is pivotably secured to a snubber axle or pin 54. The snubber 52 is therefore allowed to pivot about the snubber axle 54 relative to the fastener acceptor 22 as snubber absorbs the impact of a fastener which is provided form the parts feeder. An access plate 55 may be provided on housing 42 of fastener acceptor 22 to allow for easy access to snubber 52 as it may require replacement or adjustment over a period of time.

When installed for use at an assembly station, the automatic fastener feed system 10 of the present invention is secured at one end of the shaft section 20 to the drive socket 12 of the fastener drive motor and tool. The feed system 10 is moveable relative to the work piece 18 and may further be secured to a torque arm or balance arm 56 to stabilize the movements of the tool. As shown in FIG. 1, the torque arm 56 may be secured at one end 56a to the shaft 34 and may further be pivotably secured to a fixed platform 58 at another end 56b. The torque arm 56 may be a parallelogram arm or the like, which allows the automatic feed system 10 and the fastener driver to be easily moved horizontally and vertically to align with the mating fastener on the work piece 18, yet remain in a substantially vertical orientation. Clearly, however, other means for aligning and guiding the drive tool and fastener feed system 10 with respect to a mating fastener on a work piece may be implemented without affecting the scope of the present invention.

The vibratory parts feeder 24 is preferably a conventional parts feeder as known in the field of manufacturing, and functions to orient the fasteners 14 and then communicate them to the fastener entry area 28 in their properly oriented position. The vibratory parts feeder 24 communicates the fasteners 14 along a hollow flex track or tube 26 to the adapter 50, which interconnects an end 26a of the flex track 26 to the fastener entry area 28 of fastener acceptor 22. Although shown as a vibratory parts feeder and a flexible track or tube for providing a nut to the fastener acceptor 22, clearly the scope of the present invention includes other means of orienting and communicating an appropriate fastener in its proper orientation to the fastener acceptor 22 of automatic fastener feed system 10.

During use, a fastener 14 is provided by vibratory parts feeder 24 through the fastener entry area 28 such that the fastener contacts impact area 52a of snubber 52, which causes snubber 52 to pivot about snubber axle 54, thereby absorbing energy from the fastener entering the fastener acceptor 22. This prevents the fastener 14 from impacting an inner wall of fastener acceptor 22 and potentially deflecting back out of the fastener acceptor 22 or at least back to a point where it is no longer aligned with the second drive member 32, since a fastener may enter fastener acceptor 22 at a substantial velocity. After the fastener 14 has impacted snubber 52, the fastener remains positioned in its proper orientation immediately adjacent a fastener engaging end 32a of second drive member 32, since the system is then in its initial position with second drive member 32 being positioned slightly apart from the fastener 14. This allows fastener 14 to freely enter fastener acceptor 22 and be positioned to engage second drive member 32.

Once positioned within fastener acceptor 22, a mating surface 14a of fastener 14, which is shown in FIGS. 3 and 5 as a flange on a nut, contacts the support sections 30b of retaining arms 30, which retains the fastener 14 in its properly aligned position. With fastener 14 in its proper orientation, the mating fastener guide 43 of fastener acceptor 22 may be positioned over a mating fastener 16, such that the mating fastener 16 is then aligned with fastener 14. The drive tool may then be guided toward the workpiece to correspondingly move drive member 12 and second drive member 32 toward fastener 14. As the drive members are moved toward the fastener, inner tube 35 slides further into outer tube 34 to allow longitudinal movement of the drive tool and the drive members while fastener acceptor 22 remains substantially stationary over mating fastener 16. As drive member 12 is then moved further downward or otherwise toward the mating fastener 16, second drive member 32 correspondingly slides through cylindrical passageway 40 of fastener acceptor 22 and engages fastener 14. The retaining arms 30 and fastener 14 are held in place against second drive member 32 by springs 48, which provide a longitudinal force on retaining arms 30 to bias the fastener toward the second drive member 32, thereby retaining fastener 14 while second drive member 32 engages the fastener 14.

As the drive members are then rotated and moved further toward the mating fastener 16, in order to drive fastener 14 onto mating fastener 16, inner tube 35 inserts further into outer tube 34 while spring 36 compresses to allow second drive member 32 to extend through fastener acceptor 22. Fastener acceptor 22 is prevented from moving further once a contact surface 43a at a lower end of fastener acceptor 22 contacts the work piece 18. As second drive member 32 moves longitudinally through fastener acceptor 22, retaining arms 30 rotatably support the fastener as the arms slide longitudinally and outwardly along the slots or grooves in fastener acceptor 22. During such movement, each retaining arm 30 may project slightly below acceptor housing end 42b into the space above work piece 18 provided by the length of fastener guide 43 once contact surface 43a of fastener guide 43 engages the work piece. This allows the retaining arms 30 to continue to support fastener 14 in its appropriate orientation as it is engaged with second drive member 32, since springs 48 maintain the upward pressure by support sections 30b against the fastener 14. Because retaining arms 30 rotatably support fastener 14 as second drive member 32 rotates and moves fastener 14 toward mating fastener 16 to engage the corresponding fastener, proper alignment between the two fasteners is maintained, which substantially prevents cross-threading of the fasteners.

After fastener 14 is fully engaged with mating fastener 16, the drive motor continues to rotate to drive the drive members and the fastener 14 onto the mating fastener 16. As fastener 14 moves further through fastener acceptor 22, the retaining arms 30 correspondingly move further along fastener acceptor 22 and further outward, such that the support end 30b of each retaining arm 30 moves outward away from fastener 14 and disengages therefrom to allow fastener 14 to be further driven completely onto mating fastener 16 of work piece 18. The diameters of the cylindrical passageway 40 and of the mating fastener guide 43 of housing 42 are substantially similar and sized to allow second drive member 32 and fastener 14 to be driven entirely therethrough, thereby allowing the socket 32 to securely drive fastener 14 onto the work piece. In order to allow second drive member 32 to fully drive fastener 14 onto mating fastener 16, the initial distance between upper end 35a of inner tube 35 and upper end 34a of outer tube 34, or any other travel limiting point along outer tube 34, is preferably at least as great as the initial distance between a lower end 32a of second drive member 32 and contact surface 43a of fastener acceptor 22.

After fastener 14 has been secured to its respective mating fastener 16, the drive motor and tool may be moved away from the work piece 18. Biasing member 36 functions to move or separate fastener acceptor 22 from outer tube 34, so as to return the automatic fastener feed system to its initial position. Although the system is shown with inner tube 35 slideably engaging outer tube 34 to allow longitudinal travel of second drive member 32, clearly similar results could be attained with a single tube encasing one or more drive members and slideably engaging fastener acceptor 22, or any other means for movably interconnecting fastener acceptor 22 to the drive tool such that the drive member may rotate and slide relative to fastener acceptor 22, without affecting the scope of the present invention. While the second drive member 32 is being moved back into fastener acceptor 22 and away from mating fastener guide 43, retaining arms 30 are also moved back into their initial position A (FIG. 3) by biasing members 48. Once the system is returned to the initial position, it is again ready for a fastener 14 to be provided by vibratory parts feeder 24, as another work piece or mating fastener may be prepared to engage another corresponding fastener 14 in the drive tool and automatic fastener feed system 10.

Therefore, an automatic fastener feed system is provided which temporarily secures a fastener within a fastener acceptor 22 and within a drive member or socket. The fastener is secured within the socket only temporarily, as the feed systems allows for disengagement of the fastener as the fastener is threaded or otherwise secured to a corresponding fastener on a work piece. The springs or other means of biasing the shaft section and retaining arms of the present invention allow the system to return to an initial position after driving the fastener onto a respective mating fastener, so that the system is automatically prepared for a subsequent fastener to be provided by the vibratory parts feeder. This substantially eases the assembly process, as the line operator merely has to align the tool with the mating fastener on the work piece and activate the drive motor while moving the drive motor and fastener feed system toward the mating fastener, in a manner similar to that of a normal drive tool. The assembly line operator no longer has to orient, locate or hand start a fastener onto a correspondingly mating fastener before driving the fastener into place with the drive tool. Although the system is shown with the fastener being driven substantially downward toward a work piece, clearly the retaining arms of the present invention are capable of retaining the fastener in place, prior to the fastener engaging the corresponding mating fastener, when the fastener is being driven substantially upwardly, horizontally or any other direction toward its respective mating fastener.

Changes and modifications in this specifically described embodiments can be carried out without departing from the principles of the invention, which intended to be limited only by the scope of the appended claims, as interpreted according to the principles of patent law.

The embodiments of the invention in which an exclusive property right or privilege is claimed are defined as follows:

1. An automatic fastener system for engaging a fastener to a mating fastener at a work piece, the fastener being provided to the system via a fastener feeder which orients the fastener and provides said fastener system with a fastener in an appropriate orientation for engagement by said fastener system, said automatic fastener system comprising:

a movable drive tool member for driving the fastener to a mating fastener, said movable drive tool member being movable to align with a mating fastener; and a fastener acceptor which comprises a passageway having a fastening end and a fastener entry opening to said passageway, said fastener acceptor being adapted to receive a fastener from the fastener feeder via said fastener entry opening in said fastener acceptor and at least initially slidably support the fastener along said passageway, said movable drive tool member being slidable along said passageway to engage the fastener and drive the fastener along said passageway onto a mating fastener at said fastening end of said passageway, said fastener acceptor further having at least one retaining arm, said at least one retaining arm being positionable along said passageway to retain the fastener in the appropriate orientation until the fastener is at least partially engaged with the mating fastener by said movable drive tool member, wherein said at least one retaining arm slidably engages said fastener acceptor such that said at least one retaining arm slides toward said fastening end of said passageway and simultaneously slides radially outwardly from said passageway and outwardly from the fastener to release the fastener after the fastener engages the mating fastener.

2. The fastener system of claim 1, wherein said movable drive tool member is operable to rotatably drive a fastener onto a mating fastener, said fastener acceptor at least initially rotatably supporting the fastener along said passageway.

3. The fastener system of claim 1, wherein said fastener acceptor further comprises at least one retaining arm biasing member to bias said at least one retaining arm into an initial position where said at least one retaining arm is positioned to receive a fastener from the fastener feeder.

4. The fastener system of claim 3 further comprising an acceptor biasing member which biases said fastener acceptor at a second initial position relative to said drive tool member such that said drive tool member is positioned remotely from the fastener as the fastener is received from the fastener feeder and supported by said at least one retaining arm.

5. The fastener system of claim 3 further comprising a guide sleeve, a first end of said guide sleeve being mounted at said fastener acceptor and a second end of said guide sleeve being slidably mounted at a second sleeve of said drive tool member remote from said fastener acceptor, said drive tool member partially extending longitudinally within said guide sleeve, said drive tool member being slidable within said guide sleeve and said passageway while said guide sleeve is slidably received by said second sleeve of said drive tool member.

6. The fastener system of claim 5, wherein said guide sleeve further comprises an acceptor biasing member which biases said fastener acceptor relative to said drive tool member at a second initial position such that said drive tool member is positioned remotely from the fastener as the fastener is received from the fastener feeder and supported by said at least one retaining arm.

7. The fastener system of claim 1, wherein said fastener acceptor comprises an energy absorbing member to facilitate positioning of a fastener in said fastener acceptor, said energy absorbing member being positioned substantially opposite said fastener entry opening in said fastener acceptor, such that the fastener impacts said energy absorbing member as the fastener is received from the fastener feeder, whereby the fastener remains in a proper orientation for engagement with the drive tool member.

8. The fastener system of claim 1, wherein said fastener acceptor includes a guide flange at said fastening end and aligned with said passageway, said guide flange being operable to guide and align said fastener system and a fastener with a mating fastener.

9. The fastener system of claim 8, wherein said guide flange provides a contact surface between said fastener acceptor and the work piece as the fastener is secured to the mating fastener.

10. The fastener system of claim 1, wherein said fastener acceptor comprises a pair of retaining arms, said retaining arms being positioned substantially opposite one another and movable along said passageway of said fastener acceptor.

11. An automatic fastener system for engaging a fastener to a mating fastener at a work piece, the fastener being provided to the system via a fastener feeder which orients the fastener and provides said fastener system with a fastener in an appropriate orientation for engagement by said fastener system, said automatic fastener system comprising:

a movable drive tool member for driving the fastener to a mating fastener, said movable drive tool member being movable to align with a mating fastener; and a fastener acceptor which comprises a passageway having a fastening end and a fastener entry opening to said passageway, said fastener acceptor being adapted to receive a fastener from the fastener feeder via said fastener entry opening in said fastener acceptor and at least initially slidably support the fastener along said passageway, said movable drive tool member being slidable along said passageway to engage the fastener and drive the fastener along said passageway onto a mating fastener at said fastening end of said passageway, said fastener acceptor including an energy absorbing member to facilitate positioning of a fastener in said fastener acceptor, said energy absorbing member being positioned substantially opposite said fastener entry opening in said fastener acceptor, such that the fastener impacts said energy absorbing member as the fastener is received from the fastener feeder, whereby the fastener remains in a proper orientation for engagement with the drive tool member, wherein said energy absorbing member is pivotally mounted at said fastener acceptor to reduce rebounding motion of the fastener upon impact.

* * * * *